United States Patent
Chu et al.

(10) Patent No.: US 9,652,249 B1
(45) Date of Patent: *May 16, 2017

(54) PRELOADING AN APPLICATION WHILE AN OPERATING SYSTEM LOADS

(71) Applicant: Marvell World Trade Ltd., St. Michael (BB)

(72) Inventors: Chee Hoe Chu, San Jose, CA (US); Wei Zhou, San Jose, CA (US); Ping Zheng, San Jose, CA (US); Po-Chien Chang, Saratoga, CA (US)

(73) Assignee: Marvell World Trade Ltd., St. Michael (BB)

( * ) Notice: Subject to any disclaimer, the term of this patent is extended or adjusted under 35 U.S.C. 154(b) by 179 days.

This patent is subject to a terminal disclaimer.

(21) Appl. No.: 14/205,196

(22) Filed: Mar. 11, 2014

Related U.S. Application Data

(63) Continuation of application No. 13/657,511, filed on Oct. 22, 2012, now Pat. No. 8,688,968, which is a continuation of application No. 12/559,987, filed on Sep. 15, 2009, now Pat. No. 8,296,555.

(60) Provisional application No. 61/098,141, filed on Sep. 18, 2008.

(51) Int. Cl.
*G06F 9/445* (2006.01)
*G06F 9/44* (2006.01)

(52) U.S. Cl.
CPC ............ *G06F 9/4401* (2013.01); *G06F 9/445* (2013.01); *G06F 9/4406* (2013.01)

(58) Field of Classification Search
CPC ................................ G06F 9/4406; G06F 9/445
See application file for complete search history.

(56) References Cited

U.S. PATENT DOCUMENTS

| | | |
|---|---|---|
| 5,155,833 A | 10/1992 | Cullison et al. |
| 5,390,165 A | 2/1995 | Tuch |
| 5,467,398 A | 11/1995 | Pierce et al. |
| 5,469,506 A | 11/1995 | Berson et al. |
| 5,479,514 A | 12/1995 | Klonowski |
| 5,481,733 A | 1/1996 | Douglis et al. |
| 5,617,118 A | 4/1997 | Thompson |
| 5,673,416 A | 9/1997 | Chee et al. |
| 5,696,989 A | 12/1997 | Miura et al. |
| 5,771,356 A | 6/1998 | Leger et al. |
| 5,828,835 A | 10/1998 | Isfeld et al. |
| 5,884,099 A | 3/1999 | Klingelhofer |
| 5,991,519 A | 11/1999 | Benhammou et al. |
| 6,006,018 A | 12/1999 | Burnett et al. |
| 6,014,722 A | 1/2000 | Rudin et al. |

(Continued)

FOREIGN PATENT DOCUMENTS

| | | |
|---|---|---|
| CN | 88102647 | 12/1988 |
| CN | 1140272 | 1/1997 |

(Continued)

OTHER PUBLICATIONS

"Non-Final Office Action", U.S. Appl. No. 13/552,421, Sep. 30, 2014, 23 pages.

(Continued)

*Primary Examiner* — Jaweed A Abbaszadeh
*Assistant Examiner* — Terrell Johnson

(57) ABSTRACT

This disclosure describes techniques and/or apparatuses for reducing the total time used to boot up a computer and load applications onto the computer.

20 Claims, 6 Drawing Sheets

(56) References Cited

U.S. PATENT DOCUMENTS

| | | |
|---|---|---|
| 6,058,188 A | 5/2000 | Chandersekaran et al. |
| 6,092,108 A | 7/2000 | DiPlacido et al. |
| 6,145,069 A | 11/2000 | Dye |
| 6,167,514 A | 12/2000 | Matsui et al. |
| 6,216,230 B1 | 4/2001 | Rallis et al. |
| 6,230,277 B1 | 5/2001 | Nakaoka et al. |
| 6,330,626 B1 | 12/2001 | Dennin et al. |
| 6,389,538 B1 | 5/2002 | Gruse et al. |
| 6,463,509 B1 | 10/2002 | Teoman et al. |
| 6,473,861 B1 | 10/2002 | Stokes |
| 6,564,318 B1 | 5/2003 | Gharda et al. |
| 6,601,167 B1 | 7/2003 | Gibson et al. |
| 6,614,985 B1 | 9/2003 | Tokunaka et al. |
| 6,678,790 B1 | 1/2004 | Kumar |
| 6,704,872 B1 | 3/2004 | Okada |
| 6,711,447 B1 | 3/2004 | Saeed |
| 6,756,988 B1 | 6/2004 | Wang et al. |
| 6,799,271 B2 | 9/2004 | Kugai |
| 6,823,472 B1 | 11/2004 | DeKoning et al. |
| 6,832,280 B2 | 12/2004 | Malik et al. |
| 6,901,298 B1 | 5/2005 | Govindaraj et al. |
| 7,010,808 B1 | 3/2006 | Leung et al. |
| 7,035,827 B2 | 4/2006 | Ezaki |
| 7,036,018 B2 | 4/2006 | Horvat et al. |
| 7,069,439 B1 | 6/2006 | Chen et al. |
| 7,089,419 B2 | 8/2006 | Foster et al. |
| 7,103,788 B1 | 9/2006 | Souza et al. |
| 7,117,352 B1 | 10/2006 | Giles et al. |
| 7,126,913 B1 | 10/2006 | Patel et al. |
| 7,194,638 B1 | 3/2007 | Larky |
| 7,206,940 B2 | 4/2007 | Evans et al. |
| 7,210,038 B2 | 4/2007 | Walmsley |
| 7,266,842 B2 | 9/2007 | Foster et al. |
| 7,299,365 B2 | 11/2007 | Evans |
| 7,308,591 B2 | 12/2007 | Dubinsky |
| 7,333,464 B2 | 2/2008 | Yang et al. |
| 7,356,707 B2 | 4/2008 | Foster et al. |
| 7,370,349 B2 | 5/2008 | Holvey et al. |
| 7,373,506 B2 | 5/2008 | Asano et al. |
| 7,376,976 B2 | 5/2008 | Fierstein et al. |
| 7,496,952 B2 | 2/2009 | Edwards et al. |
| 7,499,548 B2 | 3/2009 | Meandzija et al. |
| 7,511,636 B2 | 3/2009 | Takahashi |
| 7,516,325 B2 | 4/2009 | Willey |
| 7,522,726 B1 | 4/2009 | Ishiguro et al. |
| 7,533,253 B2 | 5/2009 | Jo |
| 7,536,558 B2 | 5/2009 | Neble et al. |
| 7,549,056 B2 | 6/2009 | Carr |
| 7,571,216 B1 | 8/2009 | McRae et al. |
| 7,596,614 B2 | 9/2009 | Saunderson et al. |
| 7,606,230 B1 | 10/2009 | Cohen et al. |
| 7,620,784 B2 | 11/2009 | Panabaker |
| 7,676,040 B2 | 3/2010 | Augenstein et al. |
| 7,725,738 B1 | 5/2010 | Langhammer et al. |
| 7,743,260 B2 | 6/2010 | Fetik |
| 7,774,635 B2 | 8/2010 | Shiota |
| 7,788,670 B2 | 8/2010 | Bodas et al. |
| 7,818,389 B1 | 10/2010 | Chiang et al. |
| 7,835,725 B2 | 11/2010 | Suzuki et al. |
| 7,865,733 B2 | 1/2011 | Goto et al. |
| 7,873,841 B2 | 1/2011 | Mullis, II et al. |
| 7,898,857 B2 | 3/2011 | Kirsch et al. |
| 7,900,060 B2 | 3/2011 | Hodzic |
| 7,916,594 B2 | 3/2011 | Yang |
| 7,991,943 B2 | 8/2011 | Berenbaum et al. |
| 7,995,596 B2 | 8/2011 | Kuila et al. |
| 8,000,284 B2 | 8/2011 | Lott et al. |
| 8,001,592 B2 | 8/2011 | Hatakeyama |
| 8,094,822 B2 | 1/2012 | Suzuki |
| 8,095,816 B1 | 1/2012 | Chan |
| 8,117,478 B2 | 2/2012 | Liu et al. |
| 8,139,521 B2 | 3/2012 | Mukherjee et al. |
| 8,166,309 B2 | 4/2012 | Muralidharan et al. |
| 8,171,309 B1 | 5/2012 | Poo |
| 8,296,555 B2 | 10/2012 | Chu |
| 8,321,706 B2 | 11/2012 | Zhang |
| 8,327,056 B1 | 12/2012 | Chan |
| 8,418,242 B2 | 4/2013 | Zhang et al. |
| 8,423,789 B1 | 4/2013 | Poo et al. |
| 8,443,187 B1 | 5/2013 | Orr |
| 8,443,211 B2 | 5/2013 | Zhao et al. |
| 8,483,718 B2 | 7/2013 | Hwang |
| 8,510,560 B1 | 8/2013 | Lambert et al. |
| 8,645,716 B1 | 2/2014 | Dujari et al. |
| 8,688,968 B2 | 4/2014 | Chu et al. |
| 8,694,782 B2 | 4/2014 | Lambert |
| 8,839,016 B2 | 9/2014 | Zhang et al. |
| 8,843,686 B1 | 9/2014 | Chan et al. |
| 9,009,778 B2 | 4/2015 | Pearce et al. |
| 9,141,394 B2 | 9/2015 | Sakarda |
| 9,220,012 B1 | 12/2015 | Inamdar |
| 9,253,175 B1 | 2/2016 | Orr |
| 9,363,249 B2 | 6/2016 | Lambert et al. |
| 9,398,455 B2 | 7/2016 | Lambert |
| 9,402,270 B2 | 7/2016 | Lambert |
| 9,436,629 B2 | 9/2016 | Baratam et al. |
| 9,575,768 B1 | 2/2017 | Kim |
| 2002/0065834 A1 | 5/2002 | Wiggen et al. |
| 2002/0069354 A1* | 6/2002 | Fallon ............... G06F 3/0613 713/2 |
| 2002/0087816 A1 | 7/2002 | Atkinson et al. |
| 2002/0103930 A1 | 8/2002 | Kamentsky et al. |
| 2003/0014368 A1 | 1/2003 | Leurig et al. |
| 2003/0188162 A1 | 10/2003 | Candelore et al. |
| 2003/0200453 A1 | 10/2003 | Foster et al. |
| 2003/0200454 A1 | 10/2003 | Foster et al. |
| 2003/0208675 A1 | 11/2003 | Burokas et al. |
| 2003/0236991 A1 | 12/2003 | Letsinger |
| 2004/0015621 A1 | 1/2004 | Tanaka |
| 2004/0030909 A1 | 2/2004 | Sako et al. |
| 2004/0054898 A1 | 3/2004 | Chao et al. |
| 2004/0103272 A1 | 5/2004 | Zimmer et al. |
| 2004/0125679 A1 | 7/2004 | Kwean |
| 2004/0158669 A1 | 8/2004 | Weng et al. |
| 2004/0158708 A1 | 8/2004 | Peyravian et al. |
| 2004/0184343 A1 | 9/2004 | Roohparvar et al. |
| 2004/0187001 A1 | 9/2004 | Bousis |
| 2004/0193875 A1 | 9/2004 | Aura |
| 2004/0250057 A1 | 12/2004 | Fujita et al. |
| 2004/0257462 A1 | 12/2004 | Goris et al. |
| 2004/0264699 A1 | 12/2004 | Meandzija et al. |
| 2004/0266386 A1 | 12/2004 | Kuo |
| 2005/0015602 A1 | 1/2005 | Rees |
| 2005/0033869 A1 | 2/2005 | Cline |
| 2005/0055547 A1 | 3/2005 | Kawamura |
| 2005/0086551 A1 | 4/2005 | Wirasinghe et al. |
| 2005/0108171 A1 | 5/2005 | Bajikar et al. |
| 2005/0114686 A1 | 5/2005 | Ball et al. |
| 2005/0138365 A1 | 6/2005 | Bellipady et al. |
| 2005/0144468 A1 | 6/2005 | Northcutt et al. |
| 2005/0156925 A1 | 7/2005 | Fong et al. |
| 2005/0177674 A1 | 8/2005 | Ober et al. |
| 2005/0185596 A1 | 8/2005 | Kamentsky et al. |
| 2005/0210290 A1 | 9/2005 | Ono et al. |
| 2005/0278523 A1 | 12/2005 | Fortin et al. |
| 2006/0004946 A1 | 1/2006 | Shah et al. |
| 2006/0036897 A1 | 2/2006 | Lin et al. |
| 2006/0059372 A1 | 3/2006 | Fayar et al. |
| 2006/0072748 A1 | 4/2006 | Buer |
| 2006/0075259 A1 | 4/2006 | Bajikar et al. |
| 2006/0090084 A1 | 4/2006 | Buer |
| 2006/0104243 A1 | 5/2006 | Park |
| 2006/0117177 A1 | 6/2006 | Buer |
| 2006/0123248 A1 | 6/2006 | Porter et al. |
| 2006/0136735 A1 | 6/2006 | Plotkin et al. |
| 2006/0142906 A1 | 6/2006 | Brozovich et al. |
| 2006/0156390 A1 | 7/2006 | Baugher |
| 2006/0200670 A1 | 9/2006 | Kuffel et al. |
| 2006/0209595 A1 | 9/2006 | Newell |
| 2006/0233149 A1 | 10/2006 | Rustagi et al. |
| 2006/0236198 A1 | 10/2006 | Lintz et al. |
| 2006/0253704 A1 | 11/2006 | Kempf et al. |
| 2006/0253716 A1 | 11/2006 | Dhiman et al. |
| 2006/0259656 A1 | 11/2006 | Sullivan |

(56) References Cited

U.S. PATENT DOCUMENTS

| | | |
|---|---|---|
| 2006/0285686 A1 | 12/2006 | Van Den Heuvel et al. |
| 2007/0005824 A1 | 1/2007 | Howard |
| 2007/0011445 A1* | 1/2007 | Waltermann .......... G06F 9/4406 713/2 |
| 2007/0022469 A1 | 1/2007 | Cooper et al. |
| 2007/0038866 A1 | 2/2007 | Bardsley et al. |
| 2007/0073915 A1 | 3/2007 | Go et al. |
| 2007/0097904 A1 | 5/2007 | Mukherjee et al. |
| 2007/0098178 A1 | 5/2007 | Raikar |
| 2007/0136523 A1 | 6/2007 | Bonella et al. |
| 2007/0136792 A1 | 6/2007 | Ting et al. |
| 2007/0150756 A1 | 6/2007 | Kudelski |
| 2007/0174602 A1 | 7/2007 | Kao |
| 2007/0180271 A1 | 8/2007 | Hatakeyama et al. |
| 2007/0186105 A1 | 8/2007 | Bailey et al. |
| 2007/0189249 A1 | 8/2007 | Gurevich et al. |
| 2007/0220501 A1* | 9/2007 | Yanagawa ............... G06F 9/445 717/162 |
| 2007/0234028 A1 | 10/2007 | Rothman et al. |
| 2007/0242643 A1 | 10/2007 | Chandra et al. |
| 2007/0260905 A1 | 11/2007 | Marsden et al. |
| 2007/0277051 A1 | 11/2007 | Reece et al. |
| 2007/0297606 A1 | 12/2007 | Tkacik et al. |
| 2008/0005549 A1* | 1/2008 | Ke ....................... G06F 9/4401 713/1 |
| 2008/0016313 A1 | 1/2008 | Murotake et al. |
| 2008/0028243 A1 | 1/2008 | Morisawa |
| 2008/0034411 A1 | 2/2008 | Aoyama |
| 2008/0043508 A1 | 2/2008 | Chao et al. |
| 2008/0046732 A1 | 2/2008 | Fu et al. |
| 2008/0066075 A1 | 3/2008 | Nutter et al. |
| 2008/0072311 A1 | 3/2008 | Mullick et al. |
| 2008/0082837 A1 | 4/2008 | Mattson |
| 2008/0091944 A1 | 4/2008 | von Mueller et al. |
| 2008/0104422 A1 | 5/2008 | Mullis et al. |
| 2008/0108322 A1 | 5/2008 | Upp |
| 2008/0120717 A1 | 5/2008 | Shakkarwar |
| 2008/0165952 A1 | 7/2008 | Smith et al. |
| 2008/0295157 A1 | 11/2008 | Wong et al. |
| 2008/0298289 A1 | 12/2008 | Jeyaseelan |
| 2008/0313462 A1 | 12/2008 | Zhao et al. |
| 2009/0006658 A1 | 1/2009 | Gough et al. |
| 2009/0019250 A1 | 1/2009 | Rofougaran et al. |
| 2009/0024846 A1 | 1/2009 | Ganesan et al. |
| 2009/0049222 A1 | 2/2009 | Lee et al. |
| 2009/0059841 A1 | 3/2009 | Laroia et al. |
| 2009/0077618 A1 | 3/2009 | Pearce et al. |
| 2009/0080389 A1 | 3/2009 | Messerges et al. |
| 2009/0131061 A1 | 5/2009 | Palanki et al. |
| 2009/0199031 A1 | 8/2009 | Zhang |
| 2009/0217043 A1 | 8/2009 | Metke et al. |
| 2009/0254771 A1 | 10/2009 | So et al. |
| 2009/0323972 A1 | 12/2009 | Kohno et al. |
| 2009/0327608 A1 | 12/2009 | Eschmann et al. |
| 2010/0023747 A1 | 1/2010 | Asnaashari et al. |
| 2010/0039864 A1 | 2/2010 | Sarin et al. |
| 2010/0058045 A1 | 3/2010 | Borras et al. |
| 2010/0070751 A1 | 3/2010 | Chue |
| 2010/0122017 A1 | 5/2010 | Toyama |
| 2010/0174934 A1 | 7/2010 | Zhao |
| 2010/0217935 A1 | 8/2010 | Cho et al. |
| 2011/0039592 A1 | 2/2011 | Haddad et al. |
| 2011/0066837 A1 | 3/2011 | Lee et al. |
| 2011/0211564 A1 | 9/2011 | Yoneyama et al. |
| 2011/0231649 A1 | 9/2011 | Bollay et al. |
| 2011/0231652 A1 | 9/2011 | Bollay et al. |
| 2012/0284517 A1 | 11/2012 | Lambert |
| 2012/0287337 A1 | 11/2012 | Kumar et al. |
| 2013/0031346 A1 | 1/2013 | Sakarda |
| 2013/0046966 A1 | 2/2013 | Chu |
| 2013/0124844 A1 | 5/2013 | Baratam |
| 2013/0246792 A1 | 9/2013 | Lambert |
| 2013/0346777 A1 | 12/2013 | Zhang |
| 2014/0258724 A1 | 9/2014 | Lambert et al. |
| 2015/0071438 A1 | 3/2015 | Lambert |
| 2016/0253278 A1 | 9/2016 | Baratam et al. |

FOREIGN PATENT DOCUMENTS

| | | |
|---|---|---|
| CN | 101097522 | 1/2008 |
| CN | 102272734 | 9/2014 |
| EP | 1847911 | 10/2007 |
| EP | 2493230 | 8/2012 |
| EP | 2605170 | 6/2013 |
| GB | 2407239 | 4/2005 |
| JP | 08076872 | 3/1996 |
| JP | 09044418 | 2/1997 |
| JP | 10320302 | 12/1998 |
| JP | 2002099502 | 4/2002 |
| JP | 2002215409 | 8/2002 |
| JP | 2004005254 | 1/2004 |
| JP | 2005011120 | 1/2005 |
| JP | 5565778 | 6/2014 |
| WO | WO-2013019423 | 2/2013 |
| WO | WO-2013074797 | 5/2013 |

OTHER PUBLICATIONS

"Non-Final Office Action", U.S. Appl. No. 13/863,079, Aug. 27, 2014, 6 pages.

"Final Office Action", U.S. Appl. No. 13/958,101, Dec. 19, 2014, 17 pages.

"Final Office Action", U.S. Appl. No. 13/863,079, Jan. 15, 2015, 7 pages.

"Restriction Requirement", U.S. Appl. No. 13/676,701, Feb. 12, 2015, 7 pages.

"Final Office Action", U.S. Appl. No. 13/552,421, Mar. 16, 2015, 10 pages.

"Non-Final Office Action", U.S. Appl. No. 13/863,079, Apr. 9, 2015, 7 pages.

"Non-Final Office Action", U.S. Appl. No. 13/874,201, Jun. 5, 2015, 10 pages.

"Non-Final Office Action", U.S. Appl. No. 13/958,101, Apr. 8, 2015, 16 pages.

"Notice of Allowance", U.S. Appl. No. 13/552,421, May 12, 2015, 4 pages.

"Notice of Allowance", U.S. Appl. No. 13/552,421, Jun. 10, 2015, 5 pages.

"Foreign Office Action", KR Application No. 10-2011-7008700, Jun. 16, 2015, 13 Pages.

"Non-Final Office Action", U.S. Appl. No. 13/676,701, Jul. 31, 2015, 12 pages.

"Board Opinion", CN Application No. 200980136849.9, Aug. 28, 2015, 18 Pages.

"Notice of Allowance", U.S. Appl. No. 13/874,201, Sep. 25, 2015, 6 pages.

"Foreign Notice of Allowance", CN Application No. 200980153758.6, Jul. 15, 2014, 4 Pages.

"Foreign Office Action", CN Application No. 200980136849.9, May 19, 2014, 11 Pages.

"Extensions to Direct Link Setup (DLS) Comments", IEEE, P802.11z, Jul. 2009, pp. 1-3.

"Final Office Action", U.S. Appl. No. 12/098,254, May 18, 2011, 11 pages.

"Final Office Action", U.S. Appl. No. 12/101,668, May 10, 2012, 8 pages.

"Final Office Action", U.S. Appl. No. 12/125,670, May 24, 2011, 11 pages.

"Final Office Action", U.S. Appl. No. 12/125,693, Jun. 9, 2011, 9 pages.

"Final Office Action", U.S. Appl. No. 12/178,268, May 25, 2011, 13 pages.

"Final Office Action", U.S. Appl. No. 12/541,731, May 31, 2012, 11 pages.

"Final Office Action", U.S. Appl. No. 13/863,079, May 7, 2014, 7 pages.

(56) References Cited

OTHER PUBLICATIONS

"Foreign Office Action", CN Application No. 200980136849.9, May 24, 2013, 20 Pages.
"Foreign Decision to Grant", JP Application No. 2011-544456, May 20, 2014, 2 pages.
"Foreign Notice of Allowance", JP Application No. 2011-527899, Jan. 28, 2014, 1 Page.
"Foreign Office Action", CN Application No. 200980136849.9, Feb. 7, 2014, 15 Pages.
"Foreign Office Action", CN Application No. 200980153758.6, Apr. 27, 2013, 14 pages.
"Foreign Office Action", CN Application No. 200980153758.6, Dec. 30, 2013, 8 pages.
"Foreign Office Action", European Patent Application No. 09803951.4, May 24, 2012, 3 pages.
"Foreign Office Action", European Patent Application No. 09803951.4, Dec. 13, 2012, 6 pages.
"Foreign Office Action", JP Application No. 2011-527899, Apr. 16, 2013, 5 pages.
"Foreign Office Action", JP Application No. 2011-527899, Nov. 6, 2012, 4 pages.
"Foreign Office Action", JP Application No. 2011-527899, Aug. 13, 2013, 2 pages.
"Foreign Office Action", JP Application No. 2011-544456, Jan. 29, 2013, 7 pages.
"Foreign Office Action", JP Application No. 2011-544456, Dec. 3, 2013, 2 pages.
"Foreign Office Action", JP Application No. 2011-544456, Jul. 9, 2013, 6 pages.
"Intent to Grant", EP Application No. 09803951.4, May 14, 2013, 13 Pages.
"International Search Report and Written Opinion", Application No. PCT/US2009/067767, Mar. 26, 2010, 12 pages.
"International Search Report and Written Opinion", Application No. PCT/US2009/056973, Nov. 4, 2009, 13 pages.
"International Search Report and Written Opinion", Application No. PCT/US2012/047426, Oct. 19, 2012, 7 pages.
"International Search Report and Written Opinion", Application No. PCT/US2012/065290, May 2, 2013, 9 pages.
"International Search Report", Application No. PCT/US2008/078343, May 18, 2009, 5 pages.
"International Search Report", Application No. PCT/US2008/078343, Partial International Search,Mar. 5, 2009, 2 pages.
"Non-Final Office Action", U.S. Appl. No. 12/098,254, Jan. 14, 2011, 8 pages.
"Non-Final Office Action", U.S. Appl. No. 12/101,668, Apr. 5, 2011, 7 pages.
"Non-Final Office Action", U.S. Appl. No. 12/101,668, Aug. 9, 2012, 8 pages.
"Non-Final Office Action", U.S. Appl. No. 12/125,670, Dec. 13, 2011, 11 pages.
"Non-Final Office Action", U.S. Appl. No. 12/125,670, Dec. 7, 2010, 9 pages.
"Non-Final Office Action", U.S. Appl. No. 12/125,670, Jun. 4, 2012, 12 pages.
"Non-Final Office Action", U.S. Appl. No. 12/125,693, Oct. 3, 2011, 7 pages.
"Non-Final Office Action", U.S. Appl. No. 12/125,693, Dec. 20, 2010, 7 pages.
"Non-Final Office Action", U.S. Appl. No. 12/178,268, Dec. 21, 2011, 13 pages.
"Non-Final Office Action", U.S. Appl. No. 12/178,268, Dec. 22, 2010, 10 pages.
"Non-Final Office Action", U.S. Appl. No. 12/271,761, Oct. 3, 2011, 6 pages.
"Non-Final Office Action", U.S. Appl. No. 12/541,731, Oct. 21, 2011, 9 pages.
"Non-Final Office Action", U.S. Appl. No. 12/541,731, Sep. 4, 2012, 11 pages.
"Non-Final Office Action", U.S. Appl. No. 12/559,987, Nov. 9, 2011, 10 pages.
"Non-Final Office Action", U.S. Appl. No. 12/636,558, Jan. 10, 2012, 6 pages.
"Non-Final Office Action", U.S. Appl. No. 12/636,558, May 29, 2012, 8 pages.
"Non-Final Office Action", U.S. Appl. No. 13/252,416, Mar. 13, 2013, 16 pages.
"Non-Final Office Action", U.S. Appl. No. 13/333,551, Apr. 6, 2012, 5 pages.
"Non-Final Office Action", U.S. Appl. No. 13/598,282, Oct. 16, 2013, 6 pages.
"Non-Final Office Action", U.S. Appl. No. 13/657,511, Mar. 28, 2013, 13 pages.
"Non-Final Office Action", U.S. Appl. No. 13/683,056, Nov. 8, 2013, 5 pages.
"Non-Final Office Action", U.S. Appl. No. 13/863,079, Jun. 20, 2013, 10 pages.
"Non-Final Office Action", U.S. Appl. No. 13/863,079, Oct. 1, 2013, 9 pages.
"Non-Final Office Action", U.S. Appl. No. 13/958,101, Jun. 6, 2014, 14 pages.
"Notice of Allowance", U.S. Appl. No. 12/098,254, Dec. 14, 2011, 4 pages.
"Notice of Allowance", U.S. Appl. No. 12/098,254, Sep. 28, 2011, 4 pages.
"Notice of Allowance", U.S. Appl. No. 12/101,668, Jan. 11, 2013, 6 pages.
"Notice of Allowance", U.S. Appl. No. 12/125,670, Dec. 11, 2012, 8 pages.
"Notice of Allowance", U.S. Appl. No. 12/178,268, Jul. 2, 2012, 4 pages.
"Notice of Allowance", U.S. Appl. No. 12/271,761, Jan. 3, 2012, 6 pages.
"Notice of Allowance", U.S. Appl. No. 12/541,731, Apr. 2, 2013, 8 pages.
"Notice of Allowance", U.S. Appl. No. 12/559,987, Jun. 15, 2012, 5 pages.
"Notice of Allowance", U.S. Appl. No. 12/636,558, Jan. 9, 2013, 4 pages.
"Notice of Allowance", U.S. Appl. No. 13/252,416, Sep. 27, 2013, 10 pages.
"Notice of Allowance", U.S. Appl. No. 13/333,551, May 30, 2012, 4 pages.
"Notice of Allowance", U.S. Appl. No. 13/598,282, May 6, 2014, 4 pages.
"Notice of Allowance", U.S. Appl. No. 13/657,511, Nov. 4, 2013, 9 pages.
"Notice of Allowance", U.S. Appl. No. 13/683,056, May 9, 2014, 4 pages.
"Part 11—Wireless LAN Medium Access Control (MAC) and Physical Layer (PHY) Specifications", Information Technology—Telecommunications & Information Exchange Between Systems . . . International Standard, ISO/IEC 8802-11, First Ed., 1999, pp. 1-531.
"Supplemental Notice of Allowance", U.S. Appl. No. 12/101,668, Feb. 8, 2013, 4 pages.
"Supplemental Notice of Allowance", U.S. Appl. No. 13/333,551, Oct. 23, 2012, 2 pages.
"Restriction Requirement", U.S. Appl. No. 12/101,668, Sep. 22, 2011, 6 pages.
Anderson, "HDD Based Full Disc Encryption", In Proceedings of THIC Conference 2006, Mar. 2006, 12 pages.
"Foreign Office Action", CN Application No. 201280033662.8, May 3, 2016, 26 pages.
"Advisory Action", U.S. Appl. No. 13/804,425, Dec. 26, 2014, 3 pages.
"Amendment 3: Enhancements for Very High Throughput in the 50 GHz Band", Sponsor.
IEEE 802.11 Committee of the IEEE Computer Society, IEEE P802.11ad/D5.0 (Draft Amendment Based on IEEE P802.11REVmb D10.0) (Amendment to IEEE 802.11REVmb D10.0 as amended by IEEE 802.11ae D5.0 and IEEE 802.11aa 06.0); Draft

(56) References Cited

OTHER PUBLICATIONS

Standard for Information Technology Telecommunications and Information Exchange, Sep. 2011, 601 pages.

"Amendment 3: Enhancements for Very High Throughput in the 60 GHz Band", IEEE Standard for Information technology; Telecommunications and information exchange between systems; Local and metropolitan area networks; Specific requirements; Part 11: Wireless LAN Medium Access Control (MAC) and Physical Layer (PHY) Specifications, Jul. 2012, 628 pages.

"Amendment 4: Enhancements for Very High Throughput for Operation in Bands below 6 GHz", IEEE Standard for Information technology; Telecommunications and information exchange between systems; Local and metropolitan area networks; Specific requirements; Part 11: Wireless LAN Medium Access Control (MAC) and Physical Layer (PHY) Specifications, Sep. 2011, 425 pages.

"Amendment 4: TV White Spaces Operation", The Institute of Electrical and Electronics Engineers, Inc., IEEE Std P802.11af/D1.05 Draft Standard for Information Technology—Telecommunications and Information Exchange Between Systems—Local and Metropolitan area networks—Specific Requirements, Part 11: Wireless LAN Medium Access Control (MAC) and Physical Layer, Nov. 2011, 123 Pages.

"Amendment 6: Sub 1 GHz License Exempt Operation", 802.11 Working Group of the LAN/MAN Standards Committee of the IEEE Computer Society, IEEE P802.11ah/D1.0 Draft Standard for Information Technology—Telecommunications and Information exchange between systems Local and Metropolitan Area Networks—Specific Requirements Part 11: Wireless LAN Medium Access Control (MAC) and Physical Layer (PH, Oct. 2013, 394 Pages.

"Amendment 8: IEEE 802.11 Wireless Network Management", Prepared by the LAN/MAN Standards Committee of the IEEE Computer Society, Draft Standard for Information technology Telecommunications and information exchange between systems—Local and metropolitan area networks Specific requirements—Part 11: Wireless LAN Medium Access Control (MAC) and Physical Layer (PHY) specifications, Aug. 2010, 426 Pages.

"Corrected Notice of Allowance", U.S. Appl. No. 13/676,701, May 18, 2016, 2 pages.

"Final Office Action", U.S. Appl. No. 13/804,425, Nov. 6, 2015, 9 pages.

"Final Office Action", U.S. Appl. No. 13/804,425, Nov. 21, 2014, 17 pages.

"Final Office Action", U.S. Appl. No. 14/147,087, May 10, 2016, 14 pages.

"IEEE Standard for Information Technology—Telecommunications and Information Exchange between Systems—Local and Metropolitan Area Networks—Specific Requirements", IEEE Std. 802.11—2007, Jun. 12, 2007, 1232 pages.

"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; IEEE Std. 802.11—2012, Mar. 29, 2012, 2793 pages.

"Information Technology—Telecommunications and Information Exchange Between Systems—Local and Metropolitan Area Networks—Specific Requirements", IEEE, Wireless LAN Medium Access Control (MAC) and Physical Layer (PHY) Specifications, Aug. 20, 1999, 531 pages.

"International Search Report and Written Opinion", PCT Application No. PCT/US2013/031545, Mar. 14, 2015, 11 pages.

"International Search Report and Written Opinion", PCT Application No. PCT/US2014/0211295, Nov. 24, 2014, 16 pages.

"International Search Report and Written Opinion", PCT Application No. PCT/US2014/054885, Dec. 4, 2014, 8 pages.

"International Search Report and Written Opinion", PCT Application PCT/US2012/036236, Jul. 6, 2012, 9 pages.

"Invitation to Pay Additional Fees and Partial International Search Report", PCT Application No. PCT/US2014/021295, Aug. 13, 2014, 5 pages.

"Marketing Requirements Document for Interoperability Testing & Certification of Device Provisioning Protocol", Wi-Fi Alliance Device Provisioning Protocol Marketing Task Group; Version 1.2, 2012, 34 pages.

"Non-Final Office Action", U.S. Appl. No. 13/462,972, May 22, 2013, 10 pages.

"Non-Final Office Action", U.S. Appl. No. 13/804,425, May 4, 2015, 15 pages.

"Non-Final Office Action", U.S. Appl. No. 13/804,425, Jul. 18, 2014, 14 pages.

"Non-Final Office Action", U.S. Appl. No. 14/147,087, Oct. 8, 2015, 12 pages.

"Non-Final Office Action", U.S. Appl. No. 14/198,994, Jul. 31, 2015, 12 pages.

"Non-Final Office Action", U.S. Appl. No. 14/482,072, Nov. 19, 2015, 5 pages.

"Notice of Allowance", U.S. Appl. No. 13/804,425, Mar. 21, 2016, 9 pages.

"Notice of Allowance", U.S. Appl. No. 14/198,994, Jan. 29, 2016, 10 pages.

"Notice of Allowance", U.S. Appl. No. 14/482,072, Mar. 22, 2016, 5 pages.

"Notification Concerning Transmittal of International Preliminary Report on Patentability", PCT Application No. PCT/US2014/021295, Sep. 17, 2015, 12 pages.

"Part 16: Air Interface for Broadband Wireless Access Systems", IEEE Standard for Local and Metropolitan Area Networks, May 29, 2009, 2082 pages.

"Public Key Cryptography for the Financial Services Industry: Elliptic Curve Key Agreement and Key Transport Schemes", Working Draft; Version 2.0, Jul. 5, 1998, 125 pages.

"Specification of the Bluetooth System, Version 2.0: vol. 0", Master Table of Contents & Compliance Requirements; pp. 1-74; vol. 1, "Architecture & Terminology Overview", pp. 1-92; vol. 2, "Core System Package [Controller Volume]", pp. 1-814; vol. 4, "Core System Package [Host Volume]"; pp. 1-250, Nov. 4, 2004, 1230 pages.

"Specification Requirements Document (SRD) for Devise Provisioning Protocol", Wi-Fi Alliance Device Provisioning Protocol Marketing Task Group; Version 1.1, 2013, 13 pages.

"Wi-Fi Peer-to-Peer (P2P) Technical Specification", Wi-Fi Alliance Technical Committee P2P Task Group; Draft Version 1.14, Jun. 25, 2010, 154 pages.

"Wi-Fi Peer-to-Peer (P2P) Technical Specification", WiFi Alliance; Version 1.5, 2014, 183 pages.

Chen, "Home Network Basis: Transmission Environments and Wired/Wireless Protocols", Prentice Hall, Jul. 2003, 19 pages.

Cooper, "Internet X.509 Public Key Infrastructure Certificate and Certificate Revocation List (SRL) Profile", Network Working Group; RFC 5280, May 2008, 152 pages.

Harada, "Project: IEEE P802.15 Working Group for Wireless Personal Area Network (WPANs)", IEEE 802.15-07-0693-003c; Slides 24-33 as provided in U.S. Appl. No. 14/198,994 in an IDS submission filed Feb. 24, 2015, May 2007, 10 pages.

Harkins, "Synthetic Initialization Vecor (SIV) Authenticated Encryption Using the Advanced Encryption Standard (AES)", Network Working Group; RFC 5297; Aruba Networks, Oct. 2008, 27 pages.

Hiertz, "The IEEE 802.11 Universe", IEEE Standards in Communications and Networking; IEEE Communications Magazine, Jan. 2010, 9 pages.

Krawczyk, "HMAC-based Extract-and-Expand Key Derivation Function (HKDF)", Internet Engineering Task Forct (IETF); RFC 5869, May 2010, 15 pages.

McGrew, "Fundamental Elliptic Curve Cryptography Algorithms", Internet Engineering Task Force (IETF); RFC 6090; Fundamental Elliptic Cryptography Algorithms, Feb. 2011, 35 pages.

Perahia, "Gigabit Wireless LANs: an overview of IEEE 802.11ac and 802.11ad", ACM SIGMOBILE Mobile Computing and Communications Review; vol. 15, No. 3, 11 pages, pp. 23-33.

(56) References Cited

OTHER PUBLICATIONS

Robinson, "Wi-Fi Simple Configuration Protocol and Usability Best Practices for the Wi-Fi Protected Setup Program", Wi-Fi Alliance; Version 2.0.1, Apr. 2011, 30 pages.
Van Beijnum, "Crypto Based Host Identifiers", Internet Draft; draft-van-beijnum-multi6-cbhi-00.txt; ISSN: 0000-0004; XP15036389A, Jan. 1, 2004, 9 pages.
"Examiner's Answer to Appeal Brief", U.S. Appl. No. 13/958,101, Apr. 8, 2016, 9 pages.
"Notice of Allowance", U.S. Appl. No. 13/676,701, Feb. 10, 2016, 5 pages.
"Notice of Allowance", U.S. Appl. No. 14/147,087, Sep. 12, 2016, 5 pages.
"Corrected Notice of Allowance", U.S. Appl. No. 14/147,087, Jan. 27, 2017, 2 pages.
"PTAB Decision", U.S. Appl. No. 13/958,101, Mar. 21, 2017, 8 pages.

\* cited by examiner

PRELOADING AN APPLICATION WHILE AN OPERATING SYSTEM LOADS

RELATED APPLICATION

This application is a continuation of and claims priority U.S. Utility patent application Ser. No. 13/657,511, filed on Oct. 22, 2012, which in turn claims priority to U.S. Utility application Ser. No. 12/559,987, filed on Sep. 15, 2009, which is now U.S. Pat. No. 8,296,555, issued on Oct. 23, 2012, which claims priority to U.S. Provisional Application Ser. No. 61/098,141, filed on Sep. 18, 2008, the disclosures of which are incorporated by reference herein in their entirety. This application is further related to PCT Application serial number PCT/US09/56973, filed on Sep. 15, 2009, Chinese Application serial number 200980136849.9, filed on Mar. 18, 2011, Japanese Application serial number 2011-527899, filed on Mar. 10, 2011, and Korean Application serial number 10-2011-7008700, filed on Apr. 15, 2011.

BACKGROUND

When a personal computer is powered on, a Basic Input/Output System (BIOS) is the first code executed. Conventional BIOS identify, test, and initialize system devices, such as hard disks and other hardware. In so doing, the BIOS prepares the personal computer so that operating system software can be loaded, executed, and given control. This process of preparing a personal computer is called booting up. Booting up a personal computer is often slow, especially when the computer's operating system is large, which is more and more often the case.

Not only can booting up a computer be quite slow, a user then waits for applications to load. If the user wants to check email or prepare a word-processing document, the user conventionally turns on the personal computer, waits for it to boot up, and then waits for applications to load.

SUMMARY

This disclosure describes a method for providing one or more applications for preloading onto memory at least partially during boot up, receiving selection of one of the applications, and preloading the application into the memory at least partially during boot up. In some embodiments this method provides the applications by presenting a graphical user interface having selectable text or icons associated with each of the one or more applications. In some other embodiments of this method, the method further includes determining logic blocks of the application to preload and preloading the application by preloading the logic blocks. In such an embodiment, the method may also repeat the operations of receiving the selection of one or more of the applications to provide other selected applications and determining logic blocks of the other selected applications. In such an embodiment, the logic blocks include those of the other selected applications.

This disclosure also describes a controller configured to access, responsive to a boot-up process commencing, one or more applications stored on a hard disk drive, read the applications from the hard disk drive, and preload, at least partially during the boot-up process, the applications onto memory, the memory accessible by a computer on which the boot-up process is performed. In some cases the one or more applications are not associated with a Basic Input/Output System (BIOS) or an Operating System (OS) boot up. In some embodiments the access of one or more applications accesses an index of logic blocks associated with the one or more applications (the logic blocks stored on the hard disk drive and the index identifying the logic blocks), the read of the applications from the hard disk drive includes reading the logic blocks from the hard disk drive that are identified in the index, and the preload of the applications preloads the logic blocks onto the memory. In these some embodiments the controller can further be configured to receive, prior to the boot-up process commencing, the index and save the index on the memory. In some other of these embodiments the controller can be configured such that the index of logic blocks associated with one or more applications comprises logic blocks associated with multiple applications. In still some other of these embodiments, the controller can be configured such that the preload of the logic blocks preloads the logic blocks associated with a particular one of the one or more applications prior to completion of the boot-up process.

Further still, in other embodiments, the controller is configured such that the index is also of additional logic blocks associated with one or more additional applications stored on the hard disk drive or another hard disk drive, the order indicating the additional logic blocks to be preloaded after completion of the boot-up process, and also configured to preload the additional logic blocks onto the memory after completion of the boot-up process.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

As noted in the Background above, conventional techniques for booting up a computer and loading applications onto the computer can be quite slow. This is often true even if relatively new memory technology is used, such as flash memory or other solid state drives (SSD). This disclosure describes techniques and apparatuses for reducing the total time used to boot up a computer and load applications onto a computer.

In the discussion that follows, an example operating environment is described. Example methods are also described that may be employed in the example operating environment as well as other environments. These methods are followed by an example hard-disk-drive embodiment and an example computing-system environment in which components of FIG. 1 may be embodied. In the discussion below, reference will be made to the environment by way of example only and, therefore, implementations described below are not limited to the example environment.

Example Operating Environment

Figure 1:
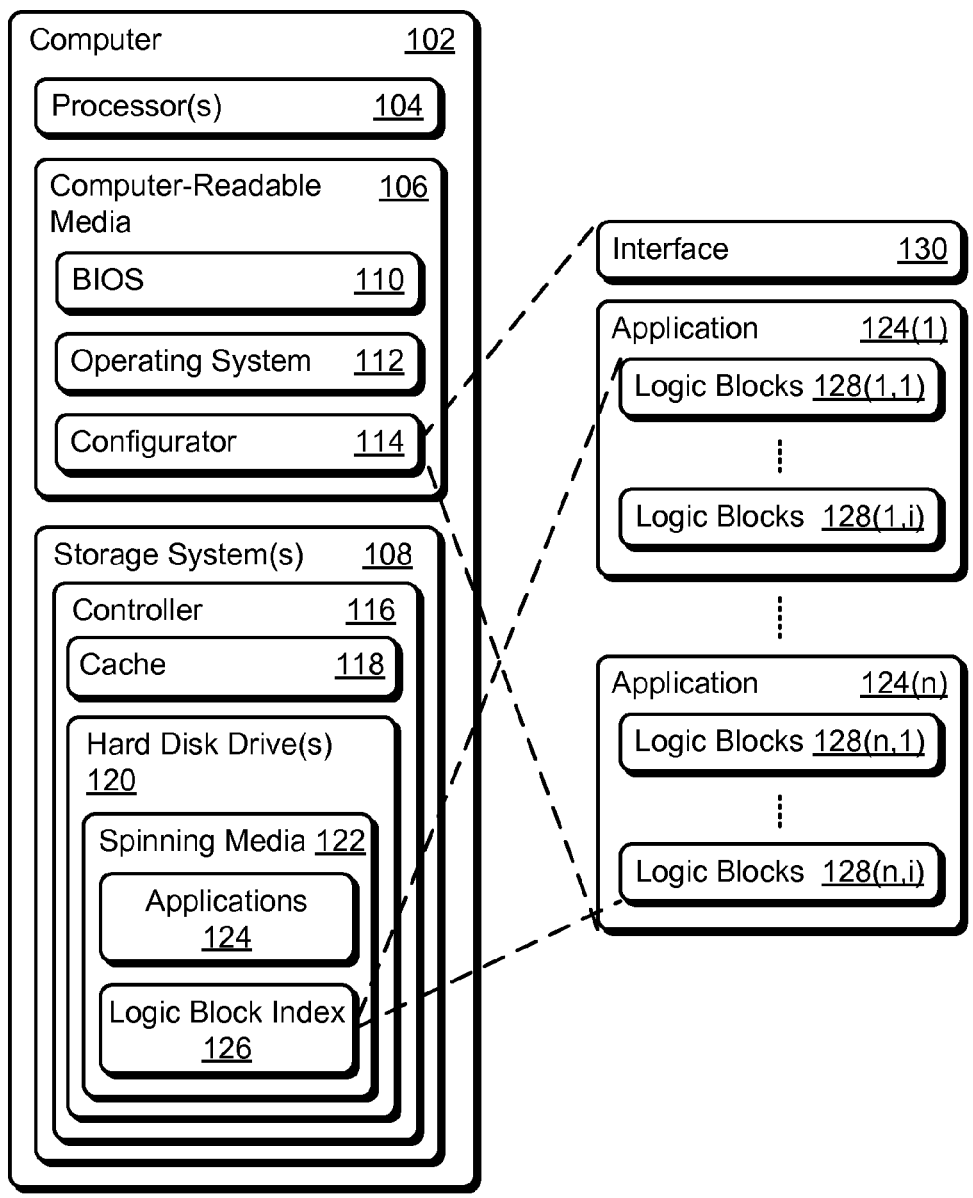
FIG. 1 illustrates an example operating environment that is configured to enable preloading techniques.

FIG. 1 illustrates an example operating environment 100, which includes a computer 102, such as a desktop personal computer, laptop, server, handheld computer, or other computing device. Computer 102 includes one or more processors 104, computer-readable media 106, and storage system(s) 108.

Processors 104 are capable of executing various programs, including those shown in computer-readable media 106. Computer-readable media 106 may include various kinds of volatile and non-volatile media, such as random access memory, flash memory, or hard disk drive(s). These hard disk drives may include or exclude those of storage system 108. Thus, storage system 108 may be the same as those included in computer-readable media 106 or be separate. Storage system 108 may also be separate from but accessible by computer 102, such as when operating as or including a wired, external hard drive. Computer-readable media 106 is shown including a Basic Input/Output System (BIOS) 110, an Operating System (OS) 112, and a configurator 114.

BIOS 110 is configured to execute in booting-up situations, such as when computer 102 is powered on, restarted, or woken up from hibernation. BIOS 110 prepares computer 102 so that operating system 112 can be loaded, executed, and given control. This preparation includes various actions, such as identifying, testing, and initializing system devices (e.g., storage system(s) 108). Operating system 112 is configured to take control of computer 102 during or following BIOS 110's boot-up operations. Operating system 112 is loaded onto system memory (not shown except as part of computer-readable media 106) prior to execution by processor(s) 104.

Storage system(s) 108 are configured to provide non-volatile memory storage using controller 116, which includes or has access to cache 118 and hard disk drive(s) 120. Hard disk drive(s) 120 include spinning media 122, such as magnetic or optical disks. Storage system(s) 108 may include a single or numerous hard disk drives, such as a RAID-controlled group of simple disk drives. If a RAID-controlled group, controller 116 is a RAID controller having significant amounts of cache memory (e.g., cache 118 is in the GB range). Spinning media 122 may store any of the elements included in computer-readable media 106, applications 124, and/or one or more logic-block index(es) 126. While FIG. 1 illustrates and environment 100 includes hard disk drives 120 and spinning media 122, other forms of memory may be used. These other forms of memory may include semiconductor or solid state memory, magnetic tape, or optical disk, to name a few.

Applications 124 may include many different software programs or routines and functions thereof, which may or may not be associated with the operating system. Non-operating-system (non-OS) applications include word-processing, email, calendar, browsing, gaming, and graphics programs, to name just a few. Applications associated with an operating system may include executable applications, applets, or various memory-based resources usable by the operating system during boot up. Applications 124 are shown including some number of applications 1 to n.

Cache 118 is configured to store logic blocks 128 of the various applications 124, which permits processors 104 to quickly load onto system memory the applications associated with the logic blocks 128. Cache 118 may include various types of memory or buffers, such as a Dynamic Random Access Memory (DRAM) or a Peripheral Component Interconnect Express (PCIe). For clarity logic blocks 128 are labeled (1,1) through (1,$i$) for those associated with application 124(1), and (n, 1) through (n,i) for those associated with application 124($n$), where the number of logic blocks is some number from 1 to i for each application 124.

Controller 116 is configured to preload logic blocks 128 at least partially during a boot-up process of computer 102. This preloading permits OS 112 to quickly access and execute the applications having those logic blocks. Controller 116 may include a cache controller card or a hard-disk-drive microcontroller, e.g., firmware and a microprocessor.

Configurator 114 is configured to determine applications for preloading (e.g., applications 124(1) to 124($n$)), determine logic blocks associated with these determined applications (e.g., logic blocks 128(1,1) to (1,$i$) and 128($n$,1) to (n,i)), and provide identifiers for these logic blocks (e.g., logic block index 126) for use by controller 116 (relationships illustrated using dashed lines in FIG. 1). Configurator 114 includes an interface 130 and applications 124 determined for preloading (shown with dashed lines). Interface 130 may aid configurator 114 in determining which applications 124 to preload, such as by enabling selection of applications by a user of computer 102. As will be described below, configurator 114 may determine applications and/or other logic blocks for preloading in other manners, including based on a history of application use.

Methods and techniques that may use these components of environment 100 are set forth in detail below.

Example Methods

As noted above, conventional techniques for booting up a computer and loading applications onto the computer can be quite slow. This disclosure describes techniques and apparatuses for reducing the total time used to boot up a computer and load applications onto the computer, for example. These techniques include example methods, which may be used separately or in combination. Aspects of these methods may be implemented in hardware, firmware, software, or a combination thereof. The methods specify operations performed by one or more entities and are not necessarily limited to the order shown for performing the operations or the entities given as examples for performing the operations.

Figure 2:
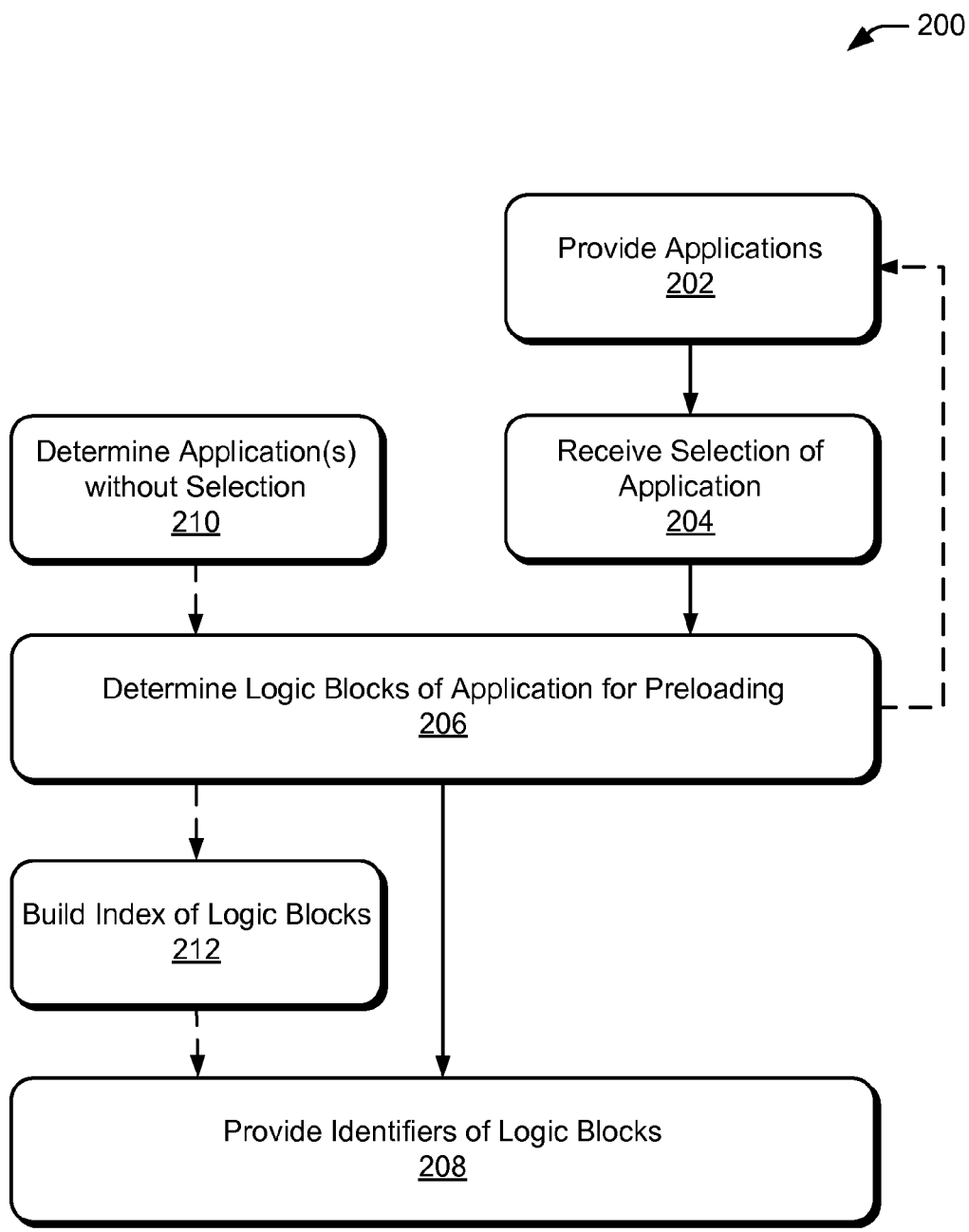
FIG. 2 illustrates a method for determining applications for preloading.

FIG. 2 depicts a method 200 for determining applications for preloading. At 202, applications for partial or complete preloading onto cache memory are provided. In an example with reference to environment 100, interface 130 of configurator 114 provides a graphical user interface displaying text and icons associated with applications 124(1) through 124($n$), such as word-processing, email, gaming, and graphics applications. These applications can be predetermined, such as those previously loaded onto spinning media 122 of hard disk drives 120, or they may be simply some collection of applications accessed by computer 102 from various local and remote sources. A user may select any one or many of these applications for preloading, though preloading is not necessarily completely or always performed during boot up, such as in cases where the cache is not sufficiently large to hold all of the selected applications' logic blocks.

At 204, selection of one of the applications is received. Here interface 130 receives some indication from a user that preloading of one of applications 124 is desired.

At 206, logic blocks of the application for preloading onto cache memory are determined. Here configurator 114 determines which logic blocks 128 are appropriate for the selected application 124, such as various executable portions. Configurator 114 may also determine an appropriate order for these logic blocks 128, such as ordering later those that build on others or ordering based on which order is most likely to permit a fastest execution of the application.

Method 200 may continue to enable selection of applications, thereby permitting more than one application to be preloaded. This is shown with a dashed line from 206 to 202. For each selected application, at 206 method 200 determines logic blocks. Following logic-block determination, method 200 may proceed to 208. At 208, method 200 provides identifiers for the logic blocks to an entity or component capable of preloading the logic blocks, such as partially or completely during boot up.

Alternatively or additionally, configurator 114 may determine which applications to preload without user selection. At 210, configurator 114 may determine which applications to preload and their order of preloading based on a history of application use or with a predetermined order, such as one set by a manufacturer of computer 102, application(s) 124, or OS 112.

At 212, method 200 may also or additionally build an index of ordered identifiers for these logic blocks. Configurator 114 may build index 126 based on an order of selection by a user, or based on other considerations, such as a largest number of applications likely to be cached before completion of the boot-up process for computer 102. The order may also be set by a user or set based on a history of which applications the user selects to execute and/or when the user does so.

If the applications are not those that are accessible during boot up by the entity responsible for preloading (e.g., controller 116), the applications may be loaded to such a location at or following 206. Thus, configurator 114 may load applications onto spinning media 122 after selection or determination of these applications. Conversely, at 202, configurator 114 may instead provide applications 124 that are already accessible by controller 116. These applications 124 can be accessed by controller 116 because they were loaded on spinning media 122 prior to the current boot up.

Alternatively or additionally to performing method 200, configurator 114 may provide other, additional applications, which may be preloaded after boot up. In such a case, configurator 114 follows method 200 for these additional applications. By so doing, applications may be preloaded following boot up, which may speed up the process of executing that application. If a user, for example, often opens a browsing application at 9:00 a.m., such as to check stock prices, configurator 114 is capable of learning this usage history of the user (or enables this selection directly by the user). Configurator 114 may indicate this in logic block index 126 so that controller 116 will preload logic blocks 128 associated with a browsing application at 8:55 a.m.

Figure 3:
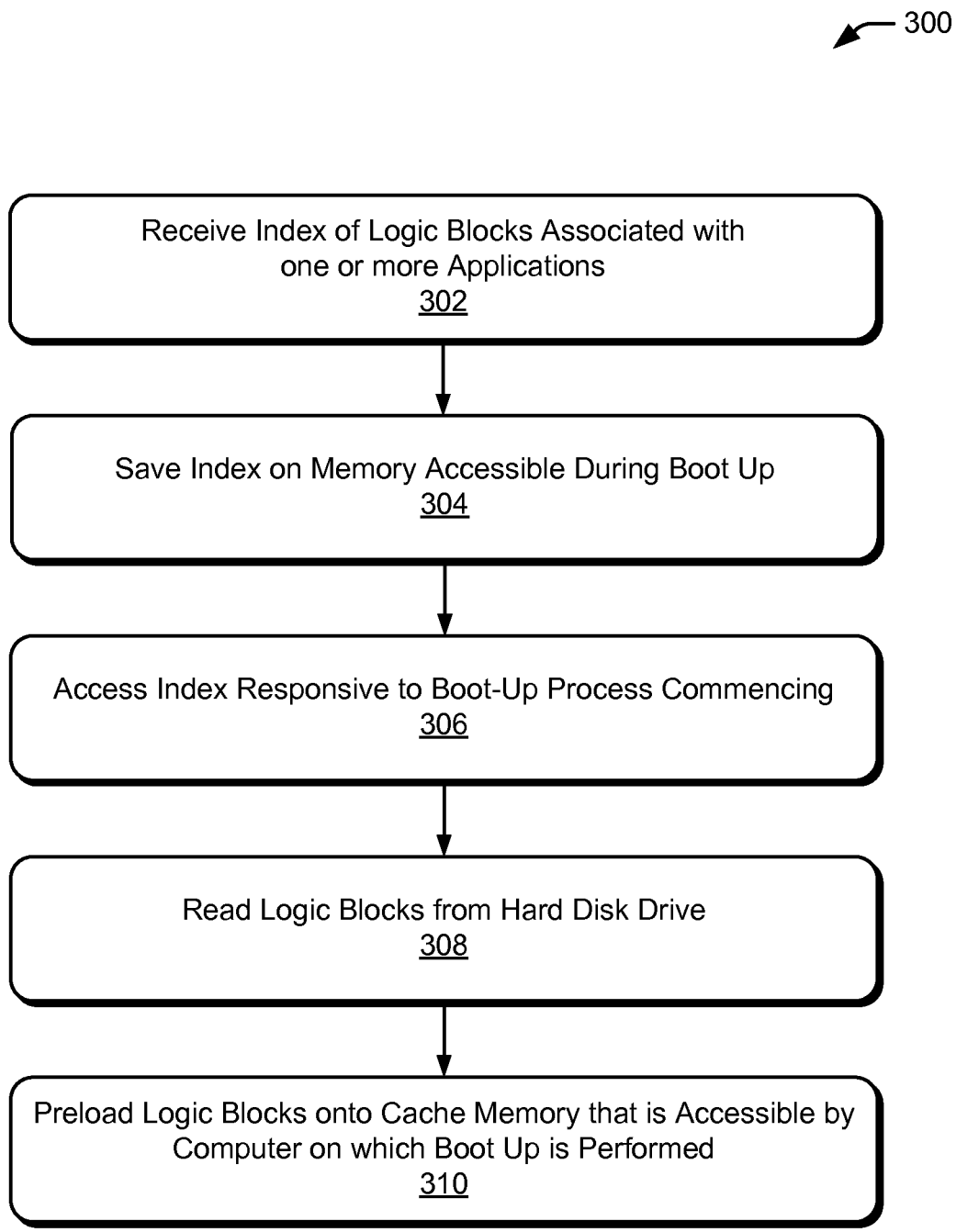
FIG. 3 illustrates a method for preloading applications at least partially during a boot-up process.

FIG. 3 depicts a method 300 for preloading applications at least partially during a boot-up process. At 302, identifiers (e.g., an index) of logic blocks associated with one or more applications are received. As noted in the above environment 100 and continuing the example described with reference to method 200, controller 116 receives logic block index 126, which identifies logic blocks 128 associated with various applications 124.

At 304, the index received is saved onto memory accessible during a boot-up process. This memory holds the index but makes it available during boot up, such as during BIOS and/or OS booting. Here index 126 is saved in spinning media 122 and is accessible during BIOS and OS boot up by controller 116.

At 306, the index responsive to a boot-up process commencing is accessed. Here controller 116 receives an indication that a boot-up process is commencing by being powered on or from receiving the indication directly from the BIOS. Thus, controller 116 is capable of accessing parts of memory on hard disk drive 120 without the boot-up processing of computer 102 completing. While the BIOS, OS, or other portions of the boot-up process are booting up, controller 116 may access index 126 and move forward with the rest of method 300. Note that 302 and 304 are performed prior to the boot-up process commencing, such as during some prior use of the computer.

At 308, logic blocks from the hard drive on which the logic blocks are saved are read. As noted, the index identifies the logic blocks to read, as well as an order of those logic blocks. Continuing the example, controller 116 reads logic blocks 128 in the order given in index 126.

At 310 these logic blocks are preloaded, at least partially during the boot-up process, onto a cache memory that is accessible by a computer on which the boot-up process is performed. 310 can be performed for each singular logic block that is read, such that some operations of method 300 are performed repeatedly. Here controller 116 reads each logic block 128 in the order given in index 126 and then saves that logic block to cache 118. Cache 118 is accessible by computer 102, including indirectly through controller 116 or directly through some other component of computer 102.

By way of example, two applications (n=1 and n=2) are to be preloaded. Assuming that the first application has four logic blocks (i=4) and the second application has six logic blocks (i=6), index 126 orders logic blocks in the following order: 1-1, 1-2, 1-3, 1-4, 2-1, 2-2, 2-3, 2-4, 2-5, and 2-6.

Figure 4:
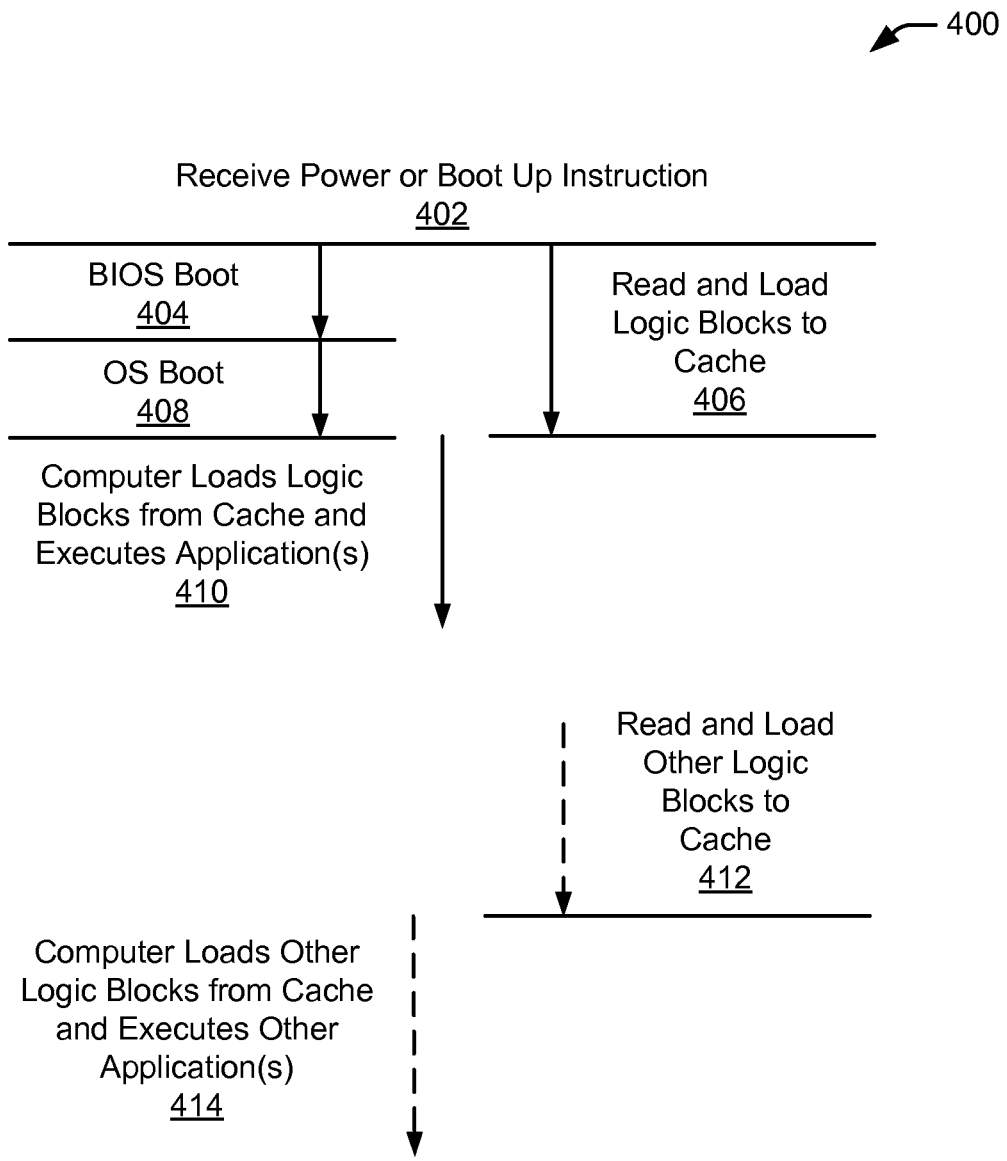
FIG. 4 illustrates an example timeline indicating when some operations of the method illustrated in FIG. 3 can be performed.

Consider also FIG. 4, which shows an example timeline 400 indicating when some operations of method 300 can be performed. Firstly, power or a boot-up instruction is received at 402. Responsive to this, BIOS 110 is booted up and begins checks and other tasks to prepare computer 102 for OS 112, which is shown as time duration 404. Also responsive to the powering up or boot-up instruction, controller 116 reads and loads logic blocks 128 associated with at least one of applications 124 onto cache 118 during time duration 406. While this is performed, OS 112 also boots during time duration 408. Note that when the boot-up process is complete and OS 112 has control of computer 102, OS 112 may quickly load logic blocks for one or more of applications 124 to system memory. Once the logic block or blocks are loaded to system memory, OS 112 may begin to execute the associated application(s) 124. This is shown as time duration 410. Reading and loading blocks over time duration 406 can be performed by controller 116 following 308 and 310 in FIG. 3.

Note also optional time durations 412 and 414. Over time duration 412, controller 116 may load other logic blocks for other applications, either those for which the cache did not have room during boot-up or others based on some other indication, such as a time to load logic blocks for executing an application at a particular time or order (e.g., a stock-ticker browser at 8:55 a.m.). After logic blocks are loaded onto system memory by computer 102 for execution of the associated application, the logic blocks may be deleted from cache 118 by controller 116, which opens up room for loading other logic blocks.

These methods may enable use of less-expensive memory resources, as hard disk drives are often less expensive than SSD or Flash memory. Further, these methods may also enable quicker execution of applications.

Hard Drive Example

Figure 5:
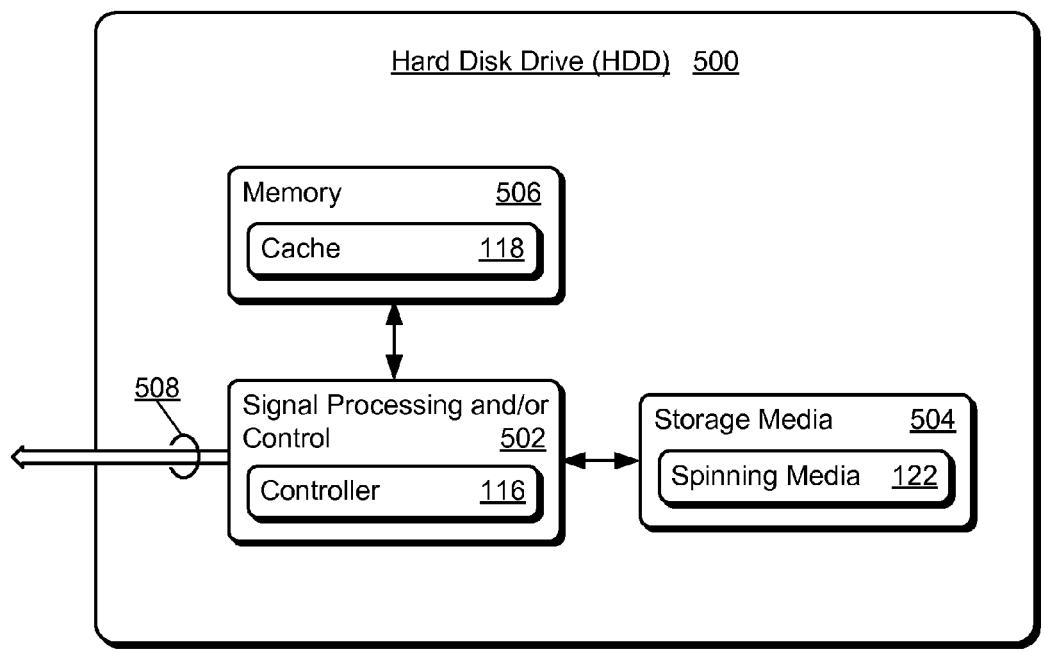
FIG. 5 illustrates an example hard-disk-drive environment for implementing embodiments of the techniques.

FIG. 5 illustrates an example hard disk drive (HDD) 500, which can implement various techniques described herein. HDD 500 includes signal processing and/or control circuit(s) generally identified at 502, storage media 504, and/or a memory 506. By way of example, signal processing and/or control circuit(s) may include controller 116, storage media 504 may include spinning media 122, and memory 506 may include or be random access memory (RAM), a low-latency nonvolatile memory such as flash memory, read only memory (ROM), and/or other suitable electronic data storage, such as cache 118. Controller 116, spinning media 122, and cache 118 are also illustrated in FIG. 1.

In various implementations, the signal processing and/or control circuit(s) 502 can be implemented to read and preload data, process data, perform data calculations, and/or format data. The data can be output to and/or received from at least storage media 504 and/or memory 506. In addition, HDD 500 can communicate with a host device via one or more wired or wireless communication links 508. The host device may include a desktop or server computer, mobile computing devices, a personal digital assistant, cellular phone, media or MP3 player, and/or other devices (e.g., computer 102 of FIG. 1).

In one implementation signal processing and/or control circuit(s) 502 may comprise a System-on-Chip (SoC) integrated with electronic circuitry, a microprocessor, memory, input-output (I/O) logic control, communication interfaces and components, other hardware, firmware, and/or software to run HDD 500. The SoC can also include an integrated data bus (not shown) that couples the various components of the SoC for data communication between the components.

Computing-System Example

Figure 6:
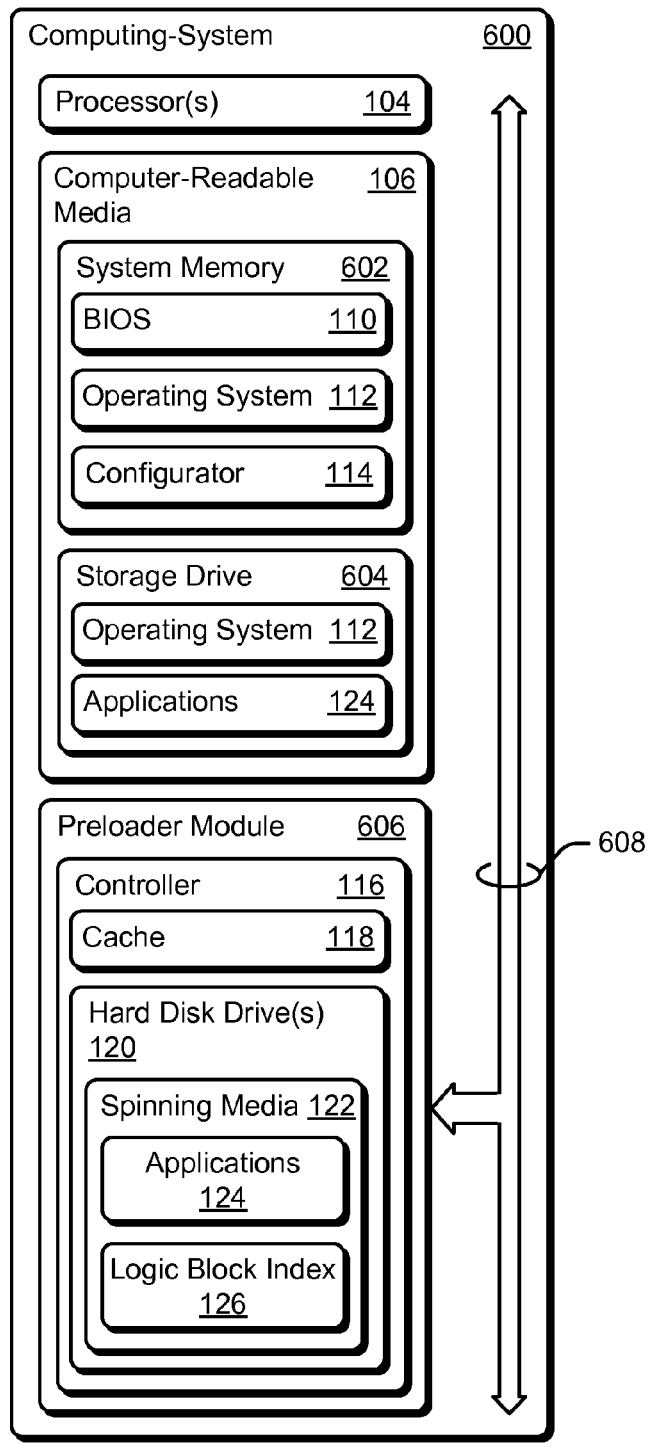
FIG. 6 illustrates an example computing-system environment for implementing embodiments of the techniques.

FIG. 6 illustrates an example computing-system 600, in which various techniques described herein can be implemented. Computing system 600 includes various components described above in association with operating environment 100 such as, processor(s) 104 and computer-readable media (CRM) 106. In this example, CRM 106 includes system memory 602 from which BIOS 110, OS 112, and configurator 114 can be loaded and/or executed by processor 104. System memory 602 may include DRAM, ROM, Flash memory and the like. CRM 106 also includes storage drive 604 for storing data of OS 112 and applications 124 of computing-system 600. Storage drive 604 may be any suitable type of drive device such as a hard disk drive or solid-state drive from which OS 112 is booted from. For example, when power is applied to computing-system 600, processor 104 fetches and executes data of OS 112 from storage drive 604 during a boot-up process.

Computing-system 600 also includes preloader module 606 having controller 116 that includes cache 118 and hard disk drive(s) 120. Preloader module 606 communicates data with other components of computing-system 600 (e.g. processor 104 or system memory 602) via system bus 608, which may include a peripheral component interconnect (PCI) bus or PCI-Express bus. Cache 118 may include any suitable type of electronic storage such as DRAM, flash memory, and the like. Controller 116 is configured to pre-load applications 124 at least partially during the boot-up process of computer-system 602. Preloading applications 124 may include fetching applications from hard disk drive 120 and loading them into cache 118. By so doing, OS 112 may launch applications from cache 118 of preloader module 606 more-quickly than applications launched from storage drive 604 of computing-system 600.

One or more of the methods described above can be performed by one or more programmable processors executing a computer program to perform functions by operating on input data and generating output. Generally, the techniques can take the form of an entirely hardware embodiment, an entirely software embodiment, or an embodiment containing both hardware and software components. In one implementation, the methods are implemented in software, which includes but is not limited to firmware, resident software, microcode, etc. Furthermore, the methods can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
   accessing, responsive to a boot-up process of a computer commencing, one or more applications stored on a first non-volatile storage device;
   accessing, responsive to a boot-up process of a computer commencing, one or more applications stored on a first non-volatile storage device;
   reading, at least partially, the one or more applications from the first non-volatile storage device;
   loading an operating system (OS) of the computer from a second non-volatile storage device into a system memory, the second non-volatile storage device being separate from the first non-volatile storage device; and
   preloading, at least partially, the one or more applications from the first non-volatile storage device into a cache memory, the cache memory being separate from the system memory, as part of the boot-up process while the OS is being loaded, thereby enabling the computer to load the one or more applications from the cache memory on completion of the boot-up process.

2. The method as recited in claim 1, wherein multiple applications are stored on the first non-volatile storage device and the method further comprises determining which of the multiple applications to preload into the cache memory based on at least one of:
   a selection previously received from a user; or
   a history of application use.

3. The method as recited in claim 2, further comprising determining an order in which to preload the one or more applications from the first non-volatile storage device into the cache memory.

4. The method as recited in claim 1, further comprising:
accessing, after completion of the boot process of the computer, one or more additional applications stored on the first non-volatile storage device; and
preloading, at least partially, the one or more additional applications from the first non-volatile storage device into the cache memory effective to enable the computer to load or execute the one or more additional applications from the cache memory.

5. The method as recited in claim 1, wherein preloading the one or more applications comprises preloading respective logic blocks associated with the one or more applications into the cache memory.

6. The method as recited in claim 5, further comprising generating an index associated with the logic blocks, the index indicating an order in which to preload the logic blocks into the cache memory.

7. The method as recited in claim 1, wherein the first non-volatile storage device is operably coupled to the cache memory via a first data bus and the second non-volatile storage device is coupled to the system memory of the computing device via a second data bus.

8. One or more computer-readable storage devices comprising processor-executable instructions, that responsive to execution by a processor, implement a preloader to:
access, responsive to a boot-up process of a computer commencing, one or more applications stored on a first non-volatile storage device;
read, at least partially, the one or more applications from the first non-volatile storage device; and
preload, at least partially, the one or more applications from the first non-volatile storage device into a cache memory while an operating system (OS) of the computer is loaded from a second non-volatile storage device into a system memory of the computer, the second non-volatile storage device being separate from the first non-volatile storage device, the cache memory being separate from the system memory, as part of the boot-up process thereby enabling the computer to load the one or more applications from the cache memory on completion of the boot-up process.

9. The one or more computer-readable storage devices as recited in claim 8, comprising additional processor-executable instructions that, responsive to execution by the processor, implement the preloader to: access an index indicating an order in which to preload the one or more applications into the cache memory; and preload the one or more applications in the order indicated by the index.

10. The one or more computer-readable storage devices as recited in claim 8, comprising additional processor-executable instructions, that responsive to execution by the processor, implement the preloader to:
access, after the boot-up process of the computer completes, one or more additional applications stored on the first non-volatile storage device; and
preload, at least partially, the one or more additional applications from the first non-volatile storage device into the cache memory effective to enable the computer to load or execute the one or more additional applications from the cache memory.

11. The one or more computer-readable storage devices as recited in claim 8, wherein the act of preloading includes preloading the one or more applications into the cache memory at least partially while a BIOS is loaded into, or executed from, the system memory.

12. The one or more computer-readable storage devices as recited in claim 8, wherein the first non-volatile storage device is operably coupled to the cache memory via a first data bus and the second non-volatile storage device is operably coupled to the system memory of the computer via a second data bus.

13. A system comprising:
an interface to a first non-volatile storage device, the first non-volatile storage device storing data associated with one or more applications of a computer;
a cache memory configured to store the data associated with the one or more applications;
an interface to system memory of the computer from which the one or more applications are executed, the system memory of the computer being separate from the cache memory;
an operating system (OS) of the computer configured to:
load from a second non-volatile storage device into the system memory of the computer, the second non-volatile storage device being separate from the first non-volatile storage device; and
a controller configured to:
access, responsive to a boot-up process of the computer commencing, the data associated with the one or more applications stored on the first non-volatile storage device; and
preload, at least partially, the data associated with the one or more applications into the cache memory while the OS is loaded as part of the boot-up process thereby enabling the OS, once the OS is loaded into and executed from the system memory, to load the one or more applications from the cache memory into the system memory for execution.

14. The system of claim 13, wherein the controller is further configured to access, prior to the boot-up process of the computer commencing, an index indicating an order in which to preload the one or more applications.

15. The system of claim 14, wherein the order in which to preload the one or more applications is based on at least one of:
a selection previously received from a user;
a history of application use; or
a preconfigured order established by a manufacturer of the computer, the operating system, or the computer.

16. The system of claim 13, wherein the controller is further configured to delete, after the one or more applications are loaded from the cache into the system memory, data associated with the one or more applications from the cache.

17. The system of claim 13, wherein the controller is further configured to preload, completely, the data associated with the one or more applications into the cache memory while the operating system (OS) of the computer is loaded from the second non-volatile storage device into the system memory.

18. The system of claim 13, wherein the first non-volatile storage device is operably coupled to the cache memory via a first data bus and the second non-volatile storage device is coupled to the system memory of the computer via a second data bus.

19. The system of claim 13, wherein the system memory of the computer is separate from the cache memory, the separation based on the cache memory being internal to the controller and the system memory being external to the controller.

20. The system of claim 13, wherein the second non-volatile storage device is separate from the first non-volatile storage device, the separation based on the first non-volatile storage device being internal to the controller and the second non-volatile storage device being external to the controller.

* * * * *